Mar. 27, 1923. 1,449,417
I. KITSEE
MANY COLORED SCREEN FOR PHOTOGRAPHY
Filed Jan. 4, 1919
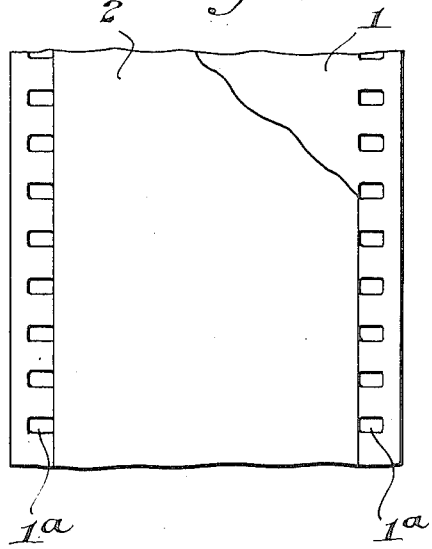
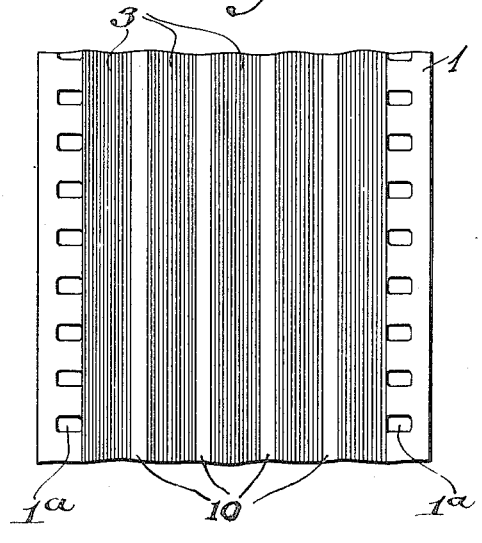
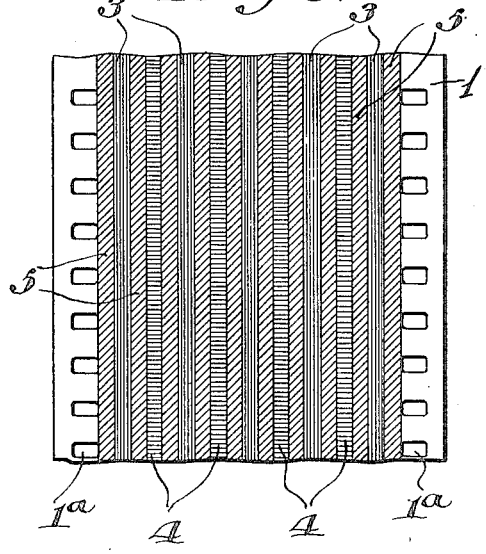
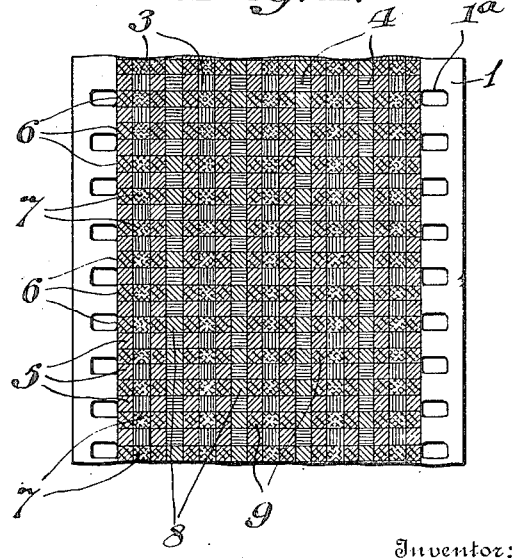
Witnesses:
R. H. Schleicher
E. E. Miller
Inventor:
Isidor Kitsee Patented Mar. 27, 1923.

1,449,417

UNITED STATES PATENT OFFICE.

ISIDOR KITSÉE, OF PHILADELPHIA, PENNSYLVANIA.

MANY-COLORED SCREEN FOR PHOTOGRAPHY.

Application filed January 4, 1919. Serial No. 269,572.

*To all whom it may concern:*

Be it known that I, ISIDOR KITSÉE, a citizen of the United States, residing at Philadelphia, in the county of Philadelphia and State of Pennsylvania, have invented certain new and useful Improvements in Many-Colored Screens for Photography, of which the following is a specification.

My invention relates to an improvement in many-colored screens for photography.

My invention may be practised with still pictures, but its great value is most apparent in moving picture films.

It is well understood that, to produce photographic transparencies in color, a screen has to be provided and it is the aim of my invention to produce such screen.

I will describe here my invention as applied to moving picture films and I will also describe the screen as being integral with the film proper, it being understood that the screen may be applied to a support separate from the film, which carries the pictures to be exhibited or the film adapted to have photographed thereon the pictures to be exhibited.

In the accompanying drawings the Figs. 1 to 4 inclusive are plan views, illustrating part of a moving picture film in the process of providing the same with a color screen.

I will now describe the mode or method of procedure in obtaining the required result, and in doing so I will refer to the different numbers as indicating the different parts of these figures, and I will here describe this my invention as being applied to moving picture films. But before describing this method I have to state, that in this my invention the screen consists entirely of colored lines, part of same running laterally and part of same running longitudinally. It has also to be stated, that the lines should be of about three times the width, generally required; for the reason that my method contemplates the overlaying of the line of one color with a line of a second color, thereby producing a third color. In fact, through this arrangement, peculiar to my invention, I am enabled to produce with the aid of lines of three colors, figurations, here squares, representing six colors.

In Fig. 1, the film or rather part of same is indicated by 1, and the perforations with which these films are usually provided by 1ª.
As the first step I surface the film proper with a film of gelatine indicated here as 2. The second step consists in providing the surface of the gelatine film with a series of colored lines spaced from each other and I select here the color red for these lines. As stated above the lines may be made of a width about three times the usual size, and for this reason, I have here illustrated each of the spaces between the different lines to be of about one-third of the width of the lines themselves, and these spaces are indicated in Fig. 2 by the numeral 10, and the lines themselves by the numeral 3. The next step is:—To provide the film with lines of a second color. These lines should in part of their width lay between and in part overlap two lines of the first color, and I select here for these second lines the color blue and in Fig. 3 the blue of these lines laying between the two red lines is indicated by 4, and the violet produced through the addition of the blue of the second line to the red of the first line is indicated by 5; it has to be stated that in this violet either the red or the blue will dominate in accordance with the ratio of density of these two colors. These two lines, the blue as well as the red, are, as illustrated in Figs. 2 and 3 longitudinally drawn the length of the film.

The next step is, to provide the film with lines laterally drawn, and of a color adapted to form a color combination with the underlying colors of the longitudinal lines, and in Fig. 4 this step is clearly illustrated. In this fig., 6 indicates the lateral lines, colored by preference yellow. This yellow produces if added to the red, an orange as indicated by 7, if added to the blue a green as indicated by 8, and if added to the over-lapping of the blue on the red a kind of purple bronze as indicated by 9. The surface of the completed screen may be provided with a protective layer of varnish, before the suitable emulsion is applied thereto.

It is unnecessary to state that in the drawings, the lines representing the colors, as well as the squares formed by said lines are greatly enlarged, so as to produce a clear illustration of same.

Having now described my invention, what I claim as new and desire to secure by Letters Patent is:—

1. The method of producing integral color screens on a gelatin surfaced moving picture film which method consists in producing upon the gelatin surfacing thereof a series of laterally spaced longitudinally arranged lines of one color, and then producing upon the same gelatin surfacing a second series of laterally spaced longitudinally arranged lines of a second color said second series of lines overlying the spaces between the lines of the first series and also overlying portions of the lines of the first series, whereby, by the overlapping of the lines of the first and the second series, longitudinally arranged laterally spaced lines of a third color are produced.

2. A gelatin surfaced moving picture film, the gelatin surface of which is provided with longitudinally arranged laterally spaced lines of at least two colors, portions of the lines of one color overlying portions of the lines of a second color and provided with transverse lines of a color different from the color of any of the longitudinally arranged lines.

In testimony whereof I affix my signature in the presence of two witnesses.

ISIDOR KITSÉE.

Witnesses:
E. E. MILLER,
JOHN J. RUTHERFORD.